Aug. 12, 1941.                S. ZOPPELT                2,252,243
                              ROPE TIE HOOK
                            Filed Oct. 2, 1939
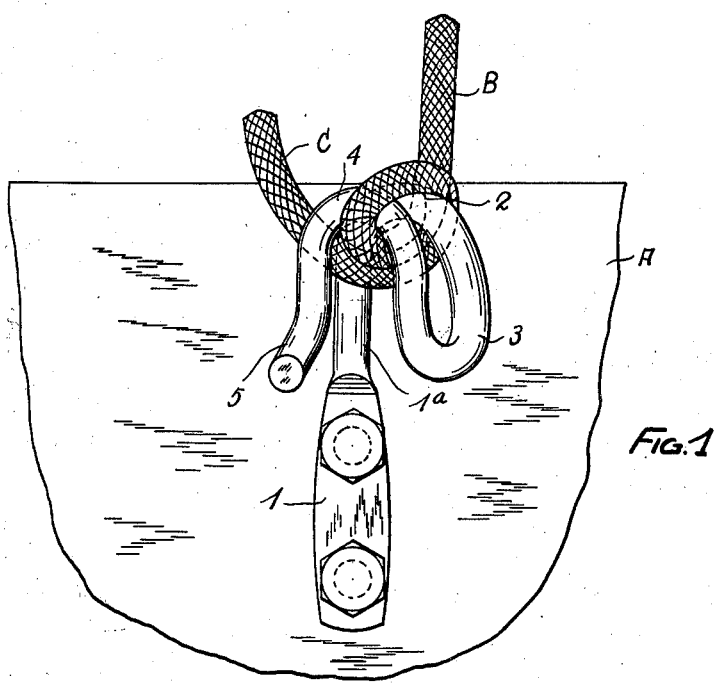
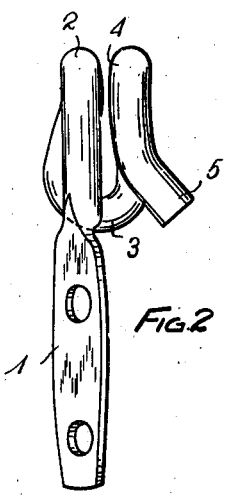
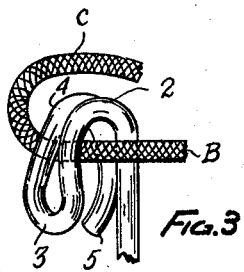
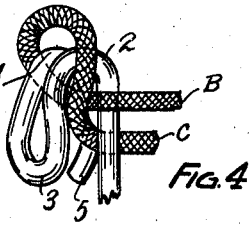
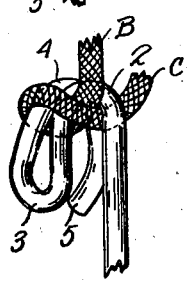
INVENTOR.
SAMUEL ZOPPELT
BY Milburn & Milburn
ATTORNEYS.

Patented Aug. 12, 1941

2,252,243

UNITED STATES PATENT OFFICE 2,252,243

ROPE TIE HOOK

Samuel Zoppelt, Berea, Ohio

Application October 2, 1939, Serial No. 297,549

1 Claim. (Cl. 24—130)

This invention relates to an improved form of hook for anchoring the end of a rope, its primary intended use being to anchor the rope of a tarpaulin cover for a truck or the like, although it may be employed also in other connections, as for instance for fastening the end of a clothes line, etc.

As will be understood, the tarpaulin cover of a truck is subjected to rather severe strains during even ordinary hauling under varying conditions of the road and load as well as the force of wind and other elements; and there is always the very serious danger of the tarpaulin ropes working loose or becoming worn, with the result that the cover would then no longer be held in the position intended.

Therefore, the object of the present invention is to provide a comparatively simple form of hook which can be manufactured in a practical manner and which is highly efficient with respect to the manner of applying the rope end thereto and the manner in which it is held in locked condition at all times, without danger of the same becoming loose either by slipping or wearing of the rope in the hook.

Other objects will appear from the following description and claim when considered together with the accompanying drawing.

In the accompanying drawing—

Fig. 1 is an elevation of my improved rope tie hook applied to a truck body;

Fig. 2 is another elevation of the same taken at approximately ninety degrees to Fig. 1;

Figs. 3, 4 and 5 illustrate the successive steps in applying a rope to my improved hook for locking engagement therewith.

It is to be understood that the present disclosure is merely for the purpose of illustration and that there may be devised various modifications thereof without departing from the spirit of invention as herein set forth and claimed.

Referring to the accompanying drawing in detail, my new device might be identified as consisting of a suitable form of shank portion 1 at its one end for attachment to the truck body, for instance, and a double form of hook at its other end, this device being made from a rigid metal rod. When attached to the body of a truck, the hook portion extends upwardly and at an angle to the shank in order that the hook will be spaced from the truck body sufficiently to permit passing the rope about the hook for attachment of the same thereto in the manner to be explained. The angular relation of the hook with respect to the shank is clearly indicated in Fig. 2 of the drawing, it being understood that this angle may vary in degree, although the angle here indicated has been found to be very satisfactory in actual practice.

Describing the hook in detail, the upwardly extending shank portion 1a is curved downwardly and outwardly away from the body of the truck, as indicated by reference numeral 2, thence slightly inwardly, outwardly and upwardly to form the bow portion 3, thence downwardly to form the portion 4 parallel to portion 2 and finally outwardly to form the flared end portion 5. The body of the truck is indicated by reference letter A.

The configurations of the hook portion may perhaps be more fully and clearly understood by thinking of the upper end portion, in the present illustration, as being first bent back upon itself so as to form the bow portion 3 while the remaining parts are substantially parallel to each other except for the flared portion 5 which is for the purpose of facilitating the insertion of the rope, as will be understood. Then, after the first bend, as above described, it may be understood that there is formed a second bend which is of double form, the bight portions of this second bend being indicated by reference numerals 2 and 4. It should be explained that the portions 2 and 4 are spaced from each other a distance substantially less than the thickness of the standard size of rope to be employed, so as to permit ready insertion thereof therebetween and to hold the same securely therein by virtue of the resilience possessed by the bow portion 3.

Assuming that that portion of the rope indicated by reference letter B is attached to the tarpaulin cover, the free end portion C of the rope is first passed beneath the portions 2 and 4 of the hook, as indicated in Fig. 2 of the drawing, then down over the portions 2 and 4, as indicated in Fig. 4, and finally inserted past the flared end portion 5 and pulled into secure engagement between the resiliently-acting portions 2 and 4, as indicated in Fig. 5, by virtue of the resilience afforded by the bow portion 3. It will be understood that there is obtained also a locking engagement between the portions of the rope itself which are caused to cross over and actually engage each other, as indicated in Figs. 4 and 5. Thus there is not only a locking engagement of the one end portion of the rope between the resiliently-acting portions of the hook but also a locking engagement between the strands of the rope itself with each other. The rope is virtually tied into a knot in its convolutions of engagement in the hook and this results in a double means of security.

By following the reverse procedure, the rope may be released from the hook, although it is merely necessary to release the rope from its engagement between the resiliently-acting portions, whereupon the rope may be readily withdrawn.

With this hook, there is found to be no danger of the rope becoming loose as a result of the ordinary tugging or pulling of the tarpaulin end of the rope but on the other hand, the harder the pull, the more secure becomes the locking engagement of the rope in the hook. Also, there is no danger of the rope becoming loosened by any slackening of the tarpaulin end of the rope, as the lock of the rope is positive and will remain unchanged and unaffected by any such slackening.

The adoption of this hook in actual service on trucks has already proved all that is herein claimed for it and it has been adopted as standard equipment by those who have learned of its merits, as herein explained.

It is to be understood that the word "rope," as employed herein, is not to be construed in a limited sense as to the size of the line but that the present device may be made for use with a line of any size without departing from the spirit of the present invention as herein described and claimed.

What I claim is:

A rope tie hook comprising a substantially stiff rod having a U-shaped bend, a bow portion extending from said bend in a plane substantially normal to that of said bend, a second substantially U-shaped bend extending from said bow and paralleling and spaced from said first-named bend a distance less than the diameter of the rope to be employed therewith so as to afford frictional locking engagement of the rope therebetween, and a diverging free end portion extending from said second-named U-shaped bend so as to serve as a means for insertion of the rope between said parallel bends, said bends possessing sufficient resilience for effective frictional engagement of the rope therebetween.

SAMUEL ZOPPELT.